United States Patent

Ratfisch

(10) Patent No.: US 8,161,621 B2
(45) Date of Patent: Apr. 24, 2012

(54) METHOD FOR FASTENING PLASTIC DRIVERS IN WASHING DRUMS

(75) Inventor: Uwe Ratfisch, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1446 days.

(21) Appl. No.: 11/662,437

(22) PCT Filed: Sep. 6, 2005

(86) PCT No.: PCT/EP2005/054382
§ 371 (c)(1),
(2), (4) Date: Mar. 9, 2007

(87) PCT Pub. No.: WO2006/027353
PCT Pub. Date: Mar. 16, 2006

(65) Prior Publication Data
US 2007/0289116 A1    Dec. 20, 2007

(30) Foreign Application Priority Data
Sep. 9, 2004    (DE) .................. 10 2004 043 716

(51) Int. Cl.
B21D 39/00    (2006.01)
(52) U.S. Cl. ........ 29/524.1; 29/243.53; 29/525.06; 69/30
(58) Field of Classification Search ............ 29/521, 29/524.1, 525.07, 505, 525.01, 525.05, 525.06, 29/243.53; 68/233, 16, 139, 142, 212; 69/30; D32/6, 29
See application file for complete search history.

(56) References Cited

U.S. PATENT DOCUMENTS

| | | | | | |
|---|---|---|---|---|---|
| 2,458,152 A | * | 1/1949 | Eakins | .................. | 264/230 |
| 2,586,794 A | * | 2/1952 | Douglas | .................. | 68/142 |
| 2,705,346 A | * | 4/1955 | Schlabach et al. | ............ | 264/249 |
| 5,153,978 A | * | 10/1992 | Simmons | .................. | 29/509 |
| 5,361,483 A | * | 11/1994 | Rainville et al. | ............ | 29/524.1 |

(Continued)

FOREIGN PATENT DOCUMENTS
DD    275 366    1/1990
(Continued)

OTHER PUBLICATIONS
International Search Report PCT/EP2005/054382.

Primary Examiner — David Bryant
Assistant Examiner — Christopher Koehler
(74) Attorney, Agent, or Firm — James E. Howard; Andre Pallapies

(57) ABSTRACT

Fastening plastic drivers in a washing machine drum having at least two domes on the inside, which comprise a cavity extending along its center line, and are oriented perpendicular to the sheet casing of the drum and which serve to fasten the driver. A hole pattern corresponding to the arrangement of the domes of a driver is punched into the sheet casing of the drum. The driver is placed with its dome ends, which project beyond the contact surface of the driver with the sheet casing, onto the sheet casing so that the dome ends pass through the holes of the hole pattern. Counter holders are inserted from the opposite side into the cavities of the domes. From the fastening side, hold-down elements are driven against the sheet casing. Heated form punches are driven against the dome ends until the dome ends have mushroom-shape ends.

15 Claims, 4 Drawing Sheets

U.S. PATENT DOCUMENTS

| | | | |
|---|---|---|---|
| 2003/0074932 A1* | 4/2003 | No et al. ............................ | 68/58 |
| 2004/0129036 A1* | 7/2004 | Ratfisch ......................... | 68/142 |
| 2005/0034431 A1* | 2/2005 | Dey et al. ........................ | 53/478 |
| 2005/0097927 A1* | 5/2005 | Kim et al. ......................... | 68/24 |
| 2005/0125985 A1* | 6/2005 | Adams et al. ................. | 29/524.1 |
| 2005/0204783 A1* | 9/2005 | Kim et al. ....................... | 68/3 R |

FOREIGN PATENT DOCUMENTS

| | | |
|---|---|---|
| DE | 27 07 224 | 8/1978 |
| DE | 38 03 195 | 8/1989 |
| GB | 1161219 | 8/1969 |
| JP | 57-195616 | 12/1982 |
| JP | 10-235086 | 9/1998 |
| JP | 2004-105250 | 4/2004 |

* cited by examiner

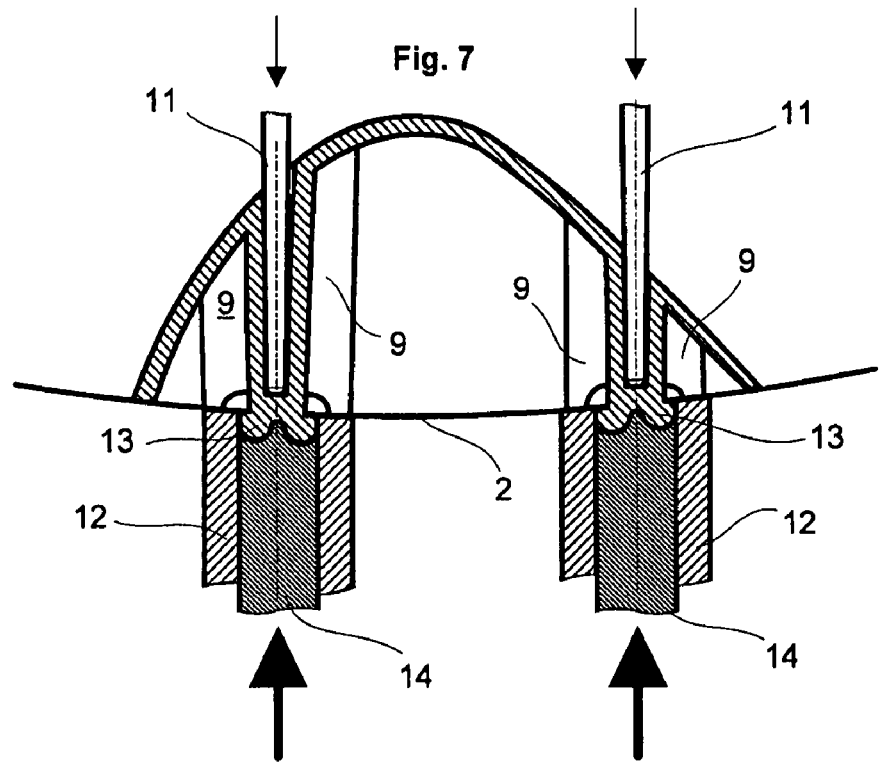
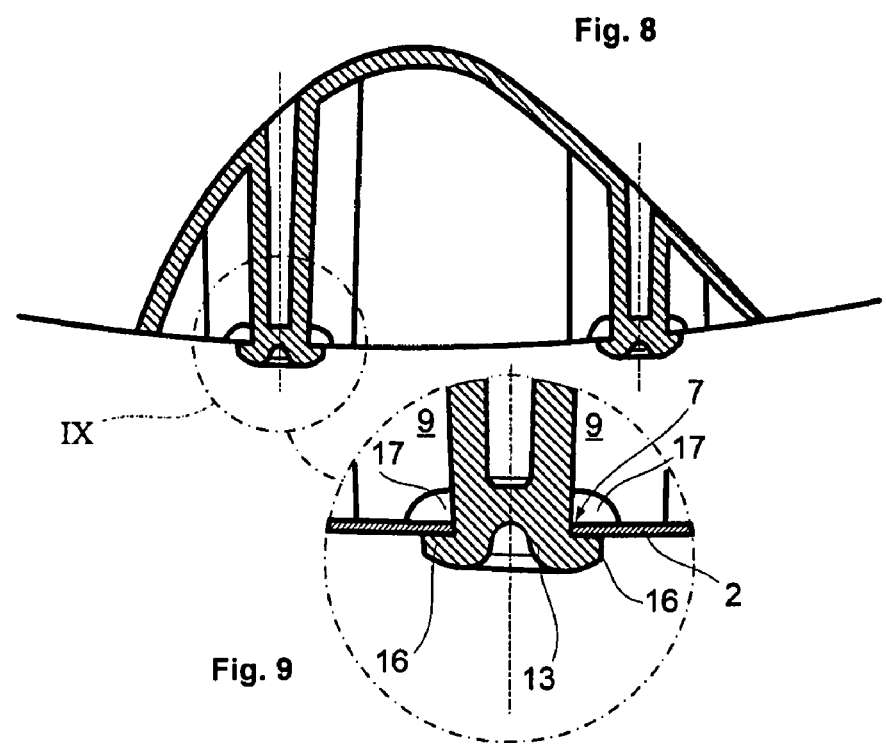

METHOD FOR FASTENING PLASTIC DRIVERS IN WASHING DRUMS

BACKGROUND OF THE INVENTION

The invention relates to a method for fastening a plastic driver made of hot-deformable plastic in a laundry drum of a washing or drying machine, wherein the driver or drivers have at least two domes on the inside, which comprise a cavity extending along its centre line, which are oriented perpendicularly to the sheet casing of the laundry drum and which serve to fasten the driver.

Such fastening methods are known (GB 1 161 219). In this case, the drivers consisting of plastic are usually prepared for fastening in such a manner that a type of dome has a rectangular cross-section and its ends which have lugs which extend sideways at right angles engage behind an edge of a likewise rectangular gap in the sheet casing. The drivers are fixed in the position predetermined by the rectangular gaps by means of a second type of domes whose cavities are suitable for screwing thread-forming screws and which merely abut from inside against the edge of the allocated hole on the sheet casing.

Drivers consisting of plastic in washing drums of high-quality washing machines are usually fastened to the inside of the sheet casing in this manner. However, it has been shown that this type of fastening of drivers cannot be made any cheaper in assembly by any rationalisation measure.

SUMMARY OF THE INVENTION

It is thus the object of the invention to provide a shape of drivers and a fastening method related thereto in which the requirements for automatic assembly are provided.

For the solution of this object the invention proposes that
- a hole pattern corresponding to the arrangement of the domes of a driver is punched into the sheet casing of the washing drum;
- the driver is placed with its dome ends which project beyond the contact surface of the driver with the sheet casing, onto the sheet casing so that the dome ends pass through the holes of the hole pattern,
- counter holders are inserted from the opposite side into the cavities of the domes,
- from the fastening side, hold-down elements are driven against the sheet casing,
- from the fastening side, form punches are driven against the dome ends which bring about heating of the dome ends until the dome ends have mushroom-shaped ends which are formed in the hot forming process and which, with their brims externally rest against the areas of the sheet casing that surrounds the holes
- and finally, all form punches, hold-down elements and counter holders are returned in this order.

In one embodiment of the invention, a fastening tool for carrying out the method is provided in which in the arrangement of the hole pattern, slightly conically shaped counter holders are fastened in such a manner that their ends come to rest under pressure against the bottoms of the cavities in the domes when the contact surface of the driver rests on the inside of the sheet casing. The conicity of the counter holders is selected in a known manner for the person skilled in the art so that the counter holders can easily be pulled from the cavity of the dome again after fastening the driver. The ends should press towards the counter holders if possible with the same force on the bottoms of the cavities so that the drivers abut uniformly at all locations and are free from play against the drum casing.

In another embodiment of the invention, the hold down elements are arranged in processual operative connection with the counter holders in such a manner that they are juxtaposed to internal parts of the driver which extend in the vicinity of the dome as far as the inner surface of the sheet casing and can be driven as far as the sheet casing which is pressed firmly against the internal parts for their working use and that form punches with mushroom-head shaped ends formed as a negative mold are arranged so that they match the hole pattern. In addition, after the counter holding and holding down these can be driven so far towards the dome ends until a sufficiently wide brim for fixing has formed on each dome end.

In a further development of the invention, it is advantageous if the domes have surrounding supporting walls which extend as far as the inner surface of the sheet casing and that each hold-down element has a hollow-cylindrical end surrounding an allocated form punch. This combination of features of the driver and the fastening tool ensures that the driver abuts absolutely securely against the inner surface of the sheet casing before the hot forming process begins. This measure ensures a permanently secure fastening of the driver.

The further developments of the method and the fastening tools for carrying out the variants of the method described in the dependent claims can be advantageously applied in any combination with one another.

BRIEF DESCRIPTION OF THE DRAWINGS

The invention is explained in detail hereinafter with reference to an exemplary embodiment shown in the drawings. In the figures:

FIG. 7 is a cross section as shown in FIG. 6 during forming the mushroom shaped ends of the dome ends by the hot form punches, FIG. 8 is a cross section through a fastened driver as shown in FIG. 6, and FIG. 9 is an enlarged view of the cutaway mushroom shaped end according to the detail IX in FIG. 7.

DETAILED DESCRIPTION OF EMBODIMENTS OF THE INVENTION

Figure 1:
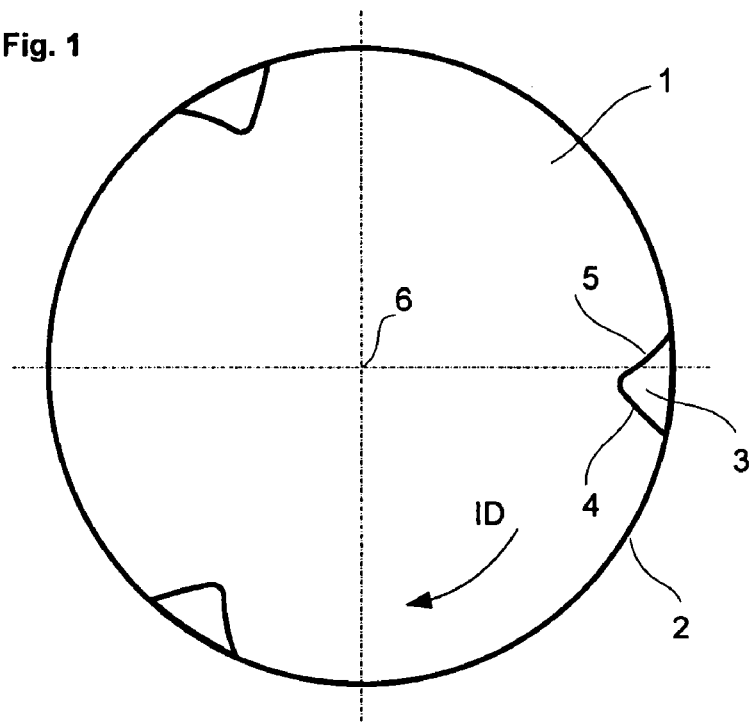
FIG. 1 is a schematic cutaway view of a washing drum with internally attached drivers.

The washing drum 1 shown schematically and in cross-section in FIG. 1 contains three laundry drivers 3 distributed uniformly on the inside of its drum casing 2, the cross section of said drivers being asymmetrical. The flank 4 of the driver 3 located at the front in the intensive direction of rotation ID is arranged more steeply with respect to the inner surface of the drum casing 2 than the flank 5 located at the rear in the intensive direction of rotation ID of the washing drum 1. As a result, less sensitive washing can be more intensively treated mechanically in the intensive direction of rotation ID than sensitive washing in the opposite direction because less steep flanks act mechanically on the laundry in the opposite direction.

Figure 2:
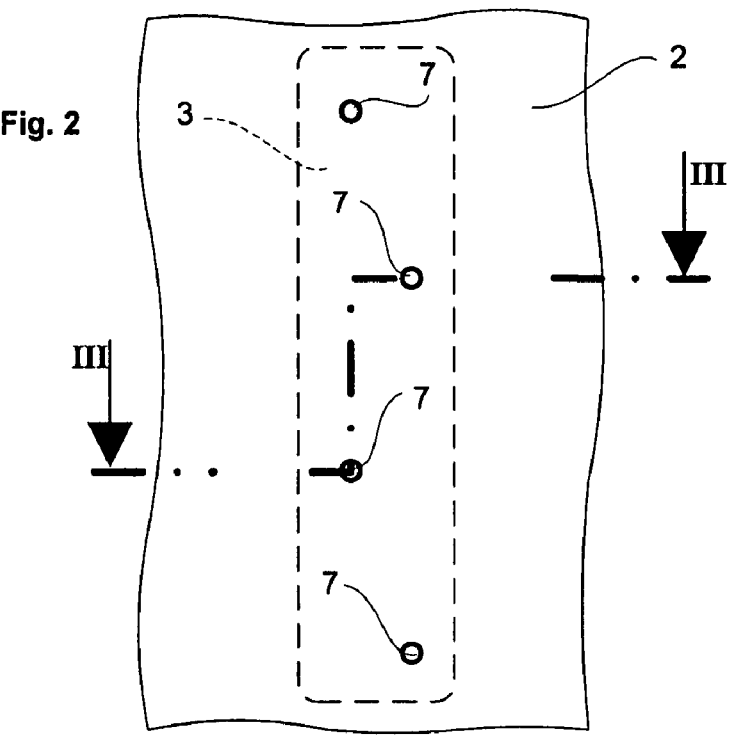
FIG. 2 is a view of a hole pattern for the dome of a driver used for fastening.

FIG. 2 is a view from outside washing drum 1 in the vicinity of a driver 3. Structures of the drum casing 2, such as flooding holes or embossed patterns have been omitted so that the interior driver 3 can be more easily identified. The driver 3 is shown by the dashed line on the inner side of the drum casing 2. Said driver is mounted approximately parallel to the drum axis (FIG. 1) and for this purpose has four domes 8 arranged in the pattern of the holes 7 (FIG. 3), which penetrate through the holes 7.

The driver 3 together with this part of the drum casing 2 is shown in cutaway view in FIGS. 3 to 8 along the plane of intersection III in FIG. 2. For this purpose, the driver 3 is formed from a shell of a plastic injection molding which is open at the bottom (towards the drum casing 2), which is substantially hollow but has four domes 8 directed perpendicularly to the drum casing 2 and two to four interior internal parts in the form of star-shaped wings 9 each grouped around a dome 8. The domes 8 for their part likewise have cavities 10 that extend over a considerable part of their length and, in this example, to a point above the level of the inner surface of the drum casing 2.

Figure 3:
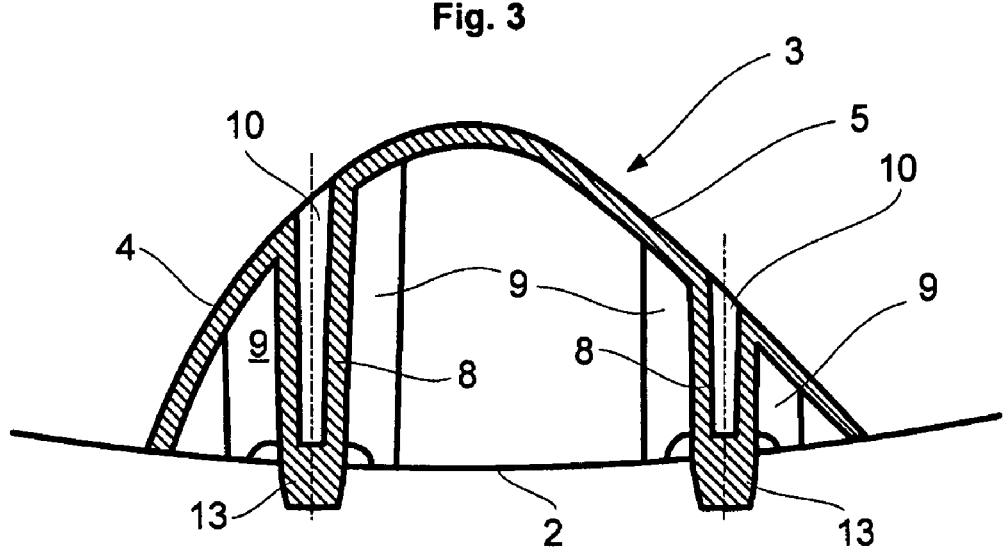
FIG. 3 is a cross section through a driver after insertion into the sheet casing.
Figure 4:
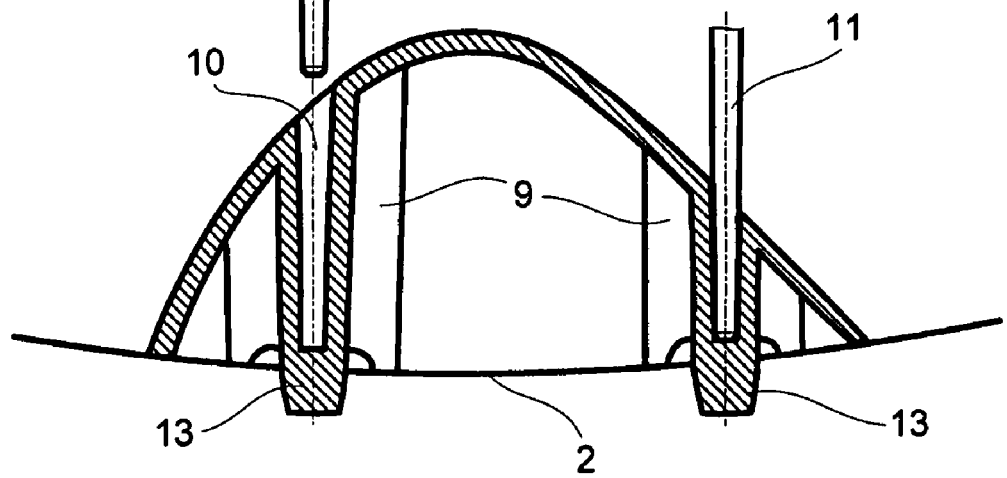
FIG. 4 is a cross section as shown in FIG. 3 during insertion of the counter holders.
Figure 5:
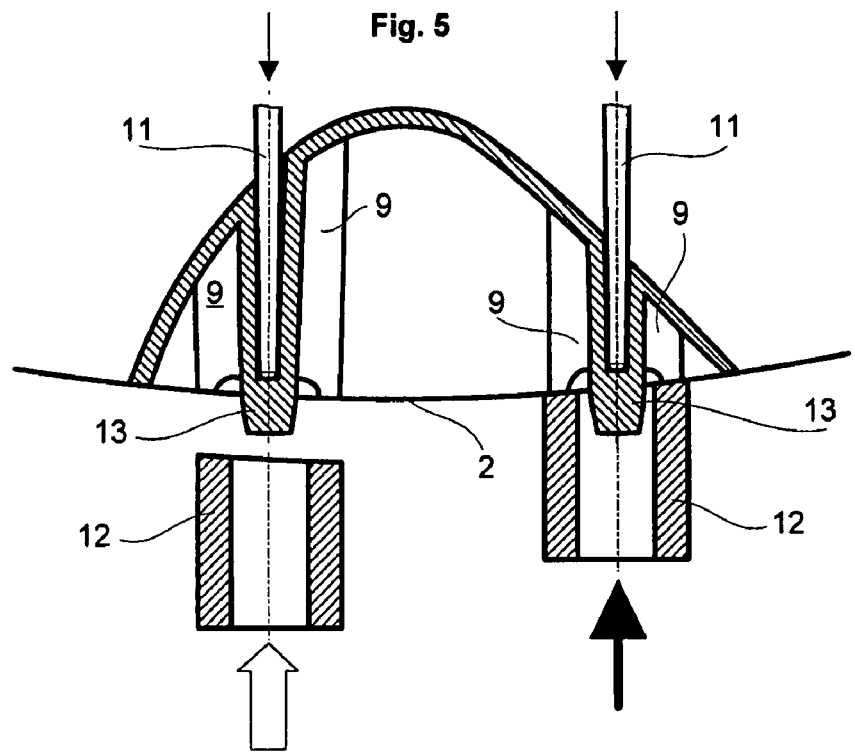
FIG. 5 is a cross section as shown in FIG. 3 when putting the hold-down elements in place.

For fastening such a driver 3, said driver is initially placed according to FIG. 3 from the interior of the washing drum 1 on the drum casing 2 and inserted with the domes 8 into the holes 7. Then, counter holders 11 are driven simultaneously into the cavities 10 of all the domes 8 as far as the base of the cavities 10 (FIG. 4) so that the driver 3 transmits approximately the same contact pressure to the drum casing 2 on all contact surfaces. From the fastening side of the dome 3 (that is the outside of the drum casing 2) hold-down elements 12 are driven against the sheet metal of the drum casing 2 (FIG. 5). These hold-down elements 12 are likewise hollow with a diameter which preferably encircles the dome ends 13 at a distance. The hold-down elements 12 are preferably driven simultaneously into the working position like the counter holders 11 so that the sheet metal of the drum casing 2 is pressed uniformly against the contact surfaces of the driver 3. The wings 9 are provided to enlarge the contact surface of the driver 3, the front faces of these wings withstanding the pressure of the hold-down elements 12.

Figure 6:
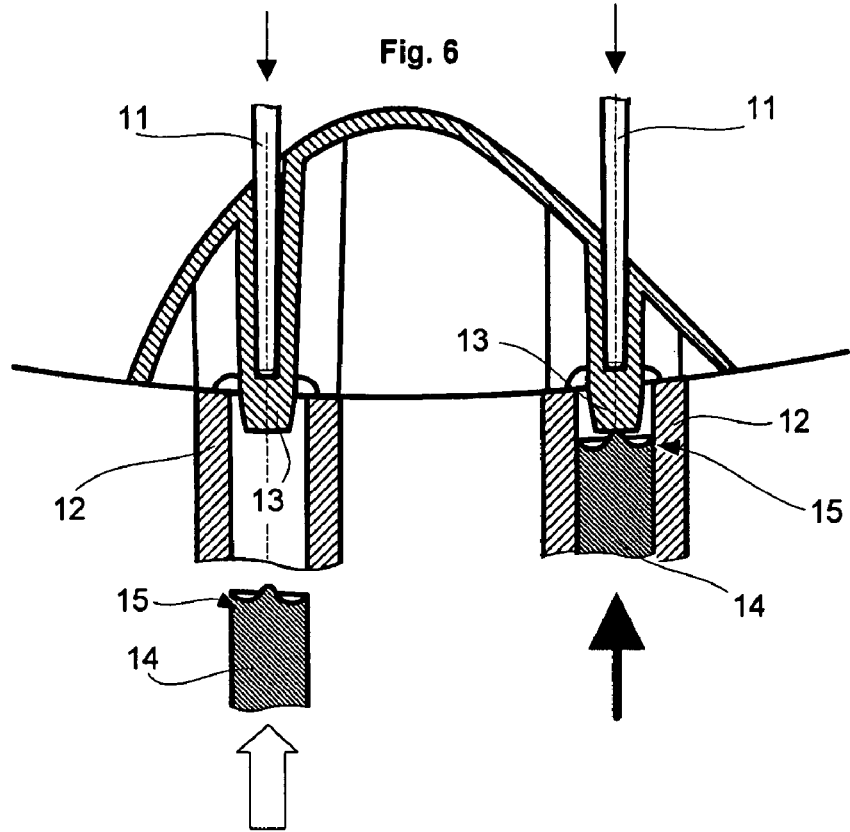
FIG. 6 is a cross section as shown in FIG. 3 during insertion of the form punches.

According to FIG. 6, form punches 14 are inserted into the cavities of the hold-down elements 12, these form punches having been previously heated and their front parts 15 having mushroom-head shaped ends formed as a negative mold. As soon as the warm front parts 15 reach the dome ends 13, the dome ends begin to melt and adapt to the mushroom shape of the front parts 15. In this case, the material of the dome ends 13 is expelled sideways and will fill the space below the form punches 14 and inside the cavity of the hold-down elements 12 (FIG. 7). The brim of the mushroom-shaped dome ends 13 thus formed rests externally on the sheet metal of the drum casing 2 and cools down after withdrawal of the form punch 14 until finally the hold-down elements 12 and the counter holders 11 can also be withdrawn without the newly formed mushroom shape of the dome ends 13 reforming. The driver thus sits firmly on the drum casing 2 (FIG. 8).

Instead of or in addition to preheating of the form punches 14, as soon as the form punches 14 have been driven into the contact position to the dome end 13, they can be excited mechanically with an ultrasound signal which they transmit to the dome ends. As a result, the co-vibrating plastic of the dome ends 13 is heated substantially faster than the form punches 14 so that the form punches 14 remain almost cold whilst the dome ends 13 are transformed very rapidly to a viscous melt and acquire a mushroom shape following the pressure of the form punches 14. The oscillation pulse can thereby be controlled as required so that only the amount of heat required to re-melt the dome ends 13 into the desired mushroom-shape ends (FIG. 8) is produced.

In the detail IX from FIG. 8 shown in FIG. 9, it can be seen that the brim 16 of the dome end 13 abuts against the drum casing 2 in a surrounding region of the hole 7, which is not supported by the opposite side as a result of recesses 17 of the wings 9. The sheet metal of the drum casing 2 springs backwards somewhat so that the brim 16 of the dome end 13 securely holds the driver under spring tension on the sheet casing. This prevents a fastened driver 3 from being able to come loose from the sheet casing to such an extent that the drivers would rattle and finally the joint would be broken as a result of the subsequent continuous relative movement towards the sheet casing.

The invention claimed is:

1. A method for fastening a plastic driver made of hot-deformable plastic, in a laundry drum of a washing or drying machine, wherein the driver has at least two domes on the inside, each dome having a cavity extending along its centre line and being oriented perpendicularly to a sheet casing of the laundry drum, the domes fastening the driver to the sheet casing, the method comprising:
   punching holes arranged in a hole pattern corresponding to the arrangement of the domes of the driver into the sheet casing of the washing drum;
   placing the driver with ends of its domes which project beyond the a contact surface of the driver with the sheet casing, onto the sheet casing so that the dome ends pass through the holes of the hole pattern;
   inserting counter holders into the cavities of the domes;
   driving hold-down elements against the sheet casing from a fastening side which is opposite to a side from which the counter holders are inserted;
   driving form punches from the fastening side against the dome ends which bring about heating of the dome ends until the dome ends have mushroom-shaped ends which are formed in a hot forming process and which, with their brims, externally rest against areas of the sheet casing that surrounds the holes; and
   returning the form punches, hold-down elements and counter holders to their pre-insertion and pre-driving positions.

2. The method according to claim 1, wherein the form punches are heated.

3. The method according to claim 1, wherein the form punches are made to vibrate ultrasonically after driving down onto the dome ends and the vibrations are transmitted to the plastic material of the dome ends, whereby the plastic material is heated.

4. A fastening tool for carrying out the method according to claim 1, wherein in the arrangement of the hole pattern, the counter holders are slightly conically shaped and are inserted in such a manner that their ends come to rest under pressure against the bottoms of the cavities in the domes when the contact surface of the driver rests on the inside the sheet casing.

5. The fastening tool according to claim 4, wherein the hold down elements in operative connection with the counter holders are arranged in such a manner that they are juxtaposed to internal parts of the driver which extend in the vicinity of the dome as far as the inner surface of the sheet casing and can be driven as far as the sheet casing which is pressed firmly against the internal parts for their working use and that form punches with mushroom-shaped ends formed as a negative mold are arranged so that they match the hole pattern, which can be driven after the counter holding and holding down so far towards the dome ends until a sufficiently wide brim for fixing has formed on each dome end, and transfers heating energy to the dome ends.

6. The fastening tool according to claim 5, wherein the domes have surrounding supporting walls which extend as far as the inner surface of the sheet casing and that each hold-down element has a hollow-cylindrical end surrounding an allocated form punch.

7. The fastening tool according to claim 6, wherein the form punch is guided almost free from play in the hollow cylinder of the hold down element.

8. The method according to claim 1, wherein each dome has an overall longitudinal dimension perpendicular to the sheet casing and an overall transverse dimension parallel to the sheet casing, and the longitudinal dimension is larger than the transverse dimension.

9. The method according to claim 1, wherein each dome has surrounding supporting walls which extend as far as the inner surface of the sheet casing, and a gap exists between each supporting wall and the dome at the surface of the sheet casing, the method further comprising driving the form punches from the fastening side against the dome ends such that the sheet casing is deformed into the gaps as the mushroom-shaped ends are formed.

10. The method according to claim 9, wherein the sheet casing is a resilient material that exerts a spring force on the mushroom-shaped ends, the spring force being caused by the sheet casing being deformed into the gaps.

11. A method for fastening a driver to a sheet casing of a drum of a laundry machine, the driver having an outside surface that contacts laundry in the drum and an inside that is opposite to the outside surface, the driver has at least two domes on the inside, each dome being oriented perpendicularly to the sheet casing and having a cavity extending along its centre line, the domes being for fastening the driver to the sheet casing, the method comprising:
 punching holes into the sheet casing of the washing drum;
 placing the driver onto the sheet casing with plastic ends of the domes passing through the holes and projecting beyond the sheet casing;
 inserting counter holders into the cavities of the domes;
 driving hold-down elements against the sheet casing from a fastening side of the sheet casing that is opposite to a side of the sheet casing from which the counter holders are inserted;
 driving form punches from the fastening side against the plastic dome ends, the form punches causing heating of the plastic dome ends until the plastic dome ends deform into mushroom-shaped ends which rest against the fastening side of the sheet casing in areas around the holes.

12. The method according to claim 11, wherein the form punches are heated.

13. The method according to claim 11, wherein the form punches are made to vibrate ultrasonically after driving down onto the plastic dome ends and the vibrations are transmitted to the plastic dome ends, whereby the plastic dome ends are heated.

14. The method according to claim 11, wherein each dome has surrounding supporting walls which extend as far as the inner surface of the sheet casing, and a gap exists between each supporting wall and the dome at the surface of the sheet casing, the method further comprising driving the form punches from the fastening side against the plastic dome ends such that the sheet casing is deformed into the gaps as the mushroom-shaped ends are formed.

15. The method according to claim 14, wherein the sheet casing is a resilient material that exerts a spring force on the mushroom-shaped ends, the spring force being caused by the sheet casing being deformed into the gaps.

* * * * *